United States Patent [19]

Kurandt et al.

[11] 4,113,835
[45] Sep. 12, 1978

[54] PROCESS FOR PREPARING PURE SYNTHETIC CALCIUM SULFATE SEMIHYDRATE

[75] Inventors: Hans-Friedrich Kurandt, Lüneberg; Dietrich Schliephake, Gladbeck, both of Germany

[73] Assignee: Veba-Chemie Aktiengesellschaft, Gelsenkirchen-Buer, Germany

[21] Appl. No.: 740,469

[22] Filed: Nov. 10, 1976

Related U.S. Application Data

[63] Continuation of Ser. No. 374,614, Jun. 28, 1973, abandoned.

[30] Foreign Application Priority Data

Jul. 6, 1972 [DE] Fed. Rep. of Germany ....... 2233189

[51] Int. Cl.² .......................................... C01F 11/46
[52] U.S. Cl. .................................. 423/170; 423/166; 423/167; 423/555
[58] Field of Search ............... 423/167, 170, 319, 320, 423/321, 555, 166; 106/110

[56] References Cited

U.S. PATENT DOCUMENTS

| | | | |
|---|---|---|---|
| 1,756,637 | 4/1930 | Edwards | 423/170 |
| 1,866,571 | 7/1932 | Larsson | 423/555 |
| 3,773,533 | 11/1973 | Omoto et al. | 106/110 |

FOREIGN PATENT DOCUMENTS

| | | | |
|---|---|---|---|
| 1,219,003 | 6/1966 | Fed. Rep. of Germany | 423/167 |
| 1,103,206 | 2/1968 | United Kingdom | 423/170 |

Primary Examiner—O. R. Vertiz
Assistant Examiner—Wayne A. Langel
Attorney, Agent, or Firm—Burgess, Dinklage & Sprung

[57] ABSTRACT

A process for the purification of phosphate containing impure gypsum to obtain therefrom calcium sulfate semihydrate in a purified form by digesting the phosphate containing gypsum with nitric acid at a temperature between 22° and 100° C, the temperature and nitric acid concentration being regulated such as to dissolve most of the phosphate impurities and to allow the recovery of calcium sulfate semihydrate.

5 Claims, 2 Drawing Figures

MODIFICATIONS OF CALCIUM SULFATE WITH USE OF $HNO_3$

PROCESS FOR PREPARING PURE SYNTHETIC CALCIUM SULFATE SEMIHYDRATE

This is a continuation of application Ser. No. 374,614, filed June 28, 1973, now abandoned.

BACKGROUND

This invention relates to the preparation of pure chemical gypsums which are produced in the manufacture of phosphoric acid by wet processes. The gypsum can be refined in a process separate from the phosphoric acid production or during the phosphoric acid process itself. The process of the invention leads directly to pure calcium sulfate semihydrate.

Phosphoric acid processes yield chemical gypsums which have a more uniform composition than natural gypsums but which are unusable for many purposes as a result of impurities, especially phosphoric acid in insoluble and water-soluble form. This is especially true with regard to the use of such gypsums in the construction and cement industry.

The $P_2O_5$ impurities in commonly used phosphoric acid processes amount to from one to two percent of the weight of the dry calcium sulfate. 80% of the $P_2O_5$ impurities are usually in insoluble form, and about 20% in soluble form. The soluble phosphoric acid can be removed by further washing with water, but not the insoluble.

The state of the art furthermore includes phosphoric acid processes in which pure gypsums are produced in the form of calcium sulfate dihydrate cystals.

In such a process, for example, first semihydrate is precipitated and then a recrystallization to large dihydrate crystals is performed, the latter being then removed by filtration. In this procedure it is possible to reduce the content of phosphoric acid in the end product to about 0.4%. This phosphoric acid content, however, is still too high for the cement industry.

The semihydrate can be obtained directly in phosphoric acid processes of this kind through the use of mixtures of phosphoric and sulfuric acid. In such processes, however, a rather high phosphoric acid content in the gypsum must accordingly be expected.

The stability range of semihydrate in relation to nitric acid concentration and temperature was determined by experiment, the products formed under the given reaction conditions (nitric acid concentration and reaction temperature) being tested to determine whether they were still capable of setting upon the addition of water. In the experiments, allowance was made, in stating the nitric acid concentration, for the diluting effect produced by the water present in the dihydrate.

In representing the results of the experiments it was found to be desirable not only to plot the concentration $c$ against the minimum temperature $t$ at which the transformation takes place (FIG. 1), but also to plot this temperature against the function $100/c$. As the corresponding FIG. 2 shows, the points of measurement arrange themselves virtually on a straight line, and in the range of between 20 and 100° C and in the concentration range above 30 wt-% $HNO_3$ ($100/c < 3.333$), the equation $$100/c = mt + b \qquad (1)$$

applies with good approximation, the constants $m$ and $b$ having the following values:

$$m \; [(= \tan \alpha)] = 0.02853 \qquad (2)$$

$$b = 0.7004 \qquad (3)$$

The stability range of calcium sulfate semihydrate thus lies below this straight line, and that of the dihydrate lies above it.

SUMMARY

Surprisingly, it has now been found that pure synthetic calcium sulfate is obtained immediately in the manufacture of phosphoric acid if the initially contaminated calcium sulfate produced is treated in the entire liquid phase at reaction temperatures $t$ between 22° and 100° C, preferably between 50° and 90° C with nitric acid of a concentration $c$ between 30 and 80 wt-% $HNO_3$, preferably 35 and 70 wt-% $HNO_3$, one of the reaction conditions (temperature or concentration) being freely variable within the stated range, while, for the other, values must be selected within the stability range of calcium sulfate semihydrate, which is determined by the area located between the straight lines defined by equations 1 to 3 and the axis of the abscissa $100/c$ in a $(t/100)/c$ diagram with integration between the $100/c$ value of such concentration limits ($100/c = 3.33$ and $100/80 = 1.25$), but excluding the temperature ranges for $<t$ 22° C and for $<t$ 100° C.

DESCRIPTION

The transformation of naturally occurring gypsums to semihydrate by strong mineral acids and by salt solution at higher temperatures is in the prior art, but what is quite surprising is the great purifying effect which is observed in accordance with the invention when nitric acid is used on gypsums produced in the manufacture of phosphoric acid. Also unexpected was the easy filtrability of the semihydrate formed by this treatment under the conditions of the invention.

The purifying effect achieved by using nitric acid is so great that the semihydrate that has formed can, after washing with water, be cast directly, without further drying, into gypsum board. Such quality improvement is not attained by treating impure chemical gypsum with other strong mineral acids or with mineral salts. A further advantage of the invention is that the nitric acid used, containing gypsum impurities, can be re-used in the process of the invention after removal of the gypsum by filtration in a fertilizer plant. The impurities removed from the gypsum by filtration and consisting mainly of $P_2O_5$ can thus be fully utilized as nutrients in the fertilizer industry.

The purification of the impure calcium sulfate dihydrate with nitric acid in accordance with the invention must be performed with sufficiently high concentrations and sufficiently high temperatures.

Figure 2:
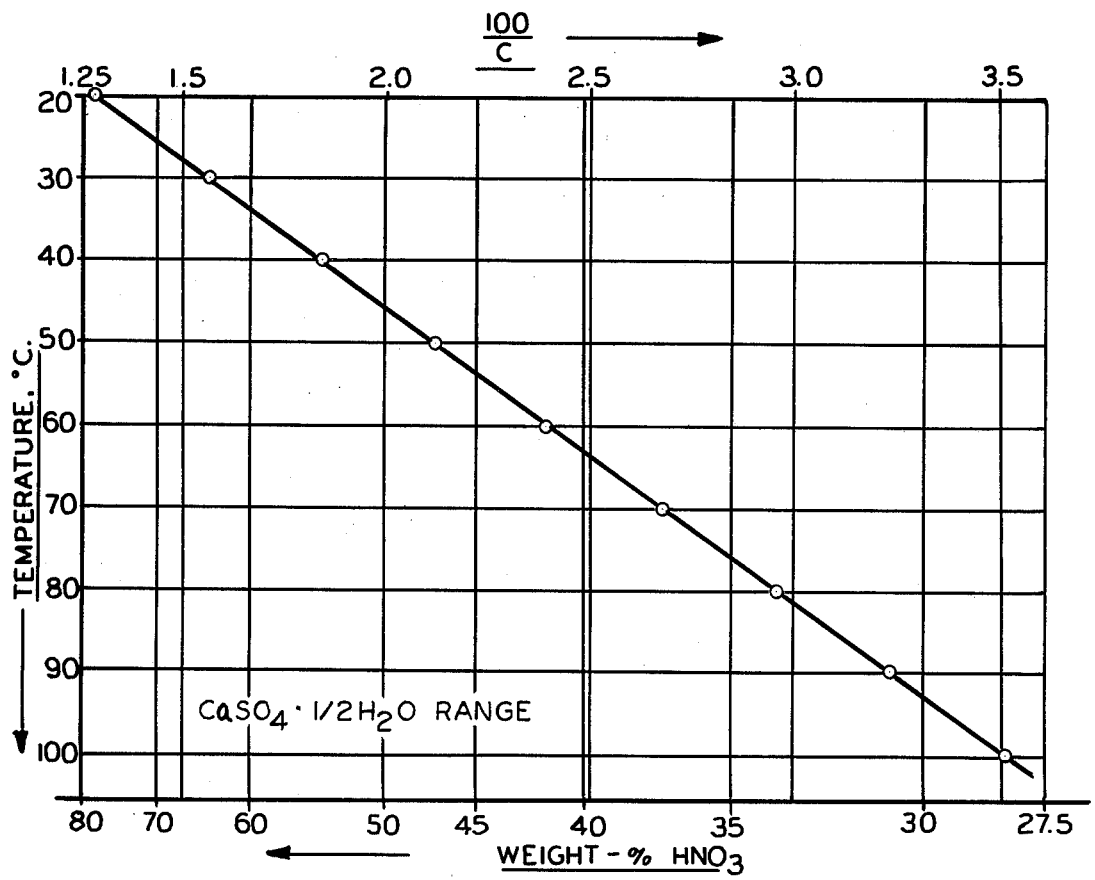
FIG. 2 is a graph plotting this temperature against the function $100/c$.

The experimental results plotted in FIG. 2 show that the semihydrate can be obtained not only at very high nitric acid concentrations (low $100/c$ values) and relatively low temperatures (e.g., 80% $HNO_3$ and 25° C) but also at medium nitric acid concentrations and high temperatures (e.g., 35 wt-% $HNO_3$ and 90° C).

To obtain easily filtrable products, it has been found desirable to operate at temperatures as high as possible. On the other hand, at excessively high temperatures undesirable acid losses would occur due to volatilization of the nitric acid. In the experiments the 50°–90° C temperature range has been found to be the preferred range, and the best nitric acid concentrations have been proven to be those between 35 and 70%.

Equations 1 to 3 are the best for calculating the necessary nitric acid concentration $c$ at a given temperature. To calculate the required temperature $t$ at a given nitric acid concentration in the entire solution, however, it is recommended to modify Equation 1 accordingly. One then obtains $$t = \frac{l}{m} \cdot \frac{100}{c} - \frac{b}{m} \ (° C) \tag{5}$$

The constants in this case have the following values:

$$1/m \ (= \cot \alpha) = 35.05 \tag{7}$$

$$b/m \ (= a) = 24.55 \tag{8}$$

Figure 1:
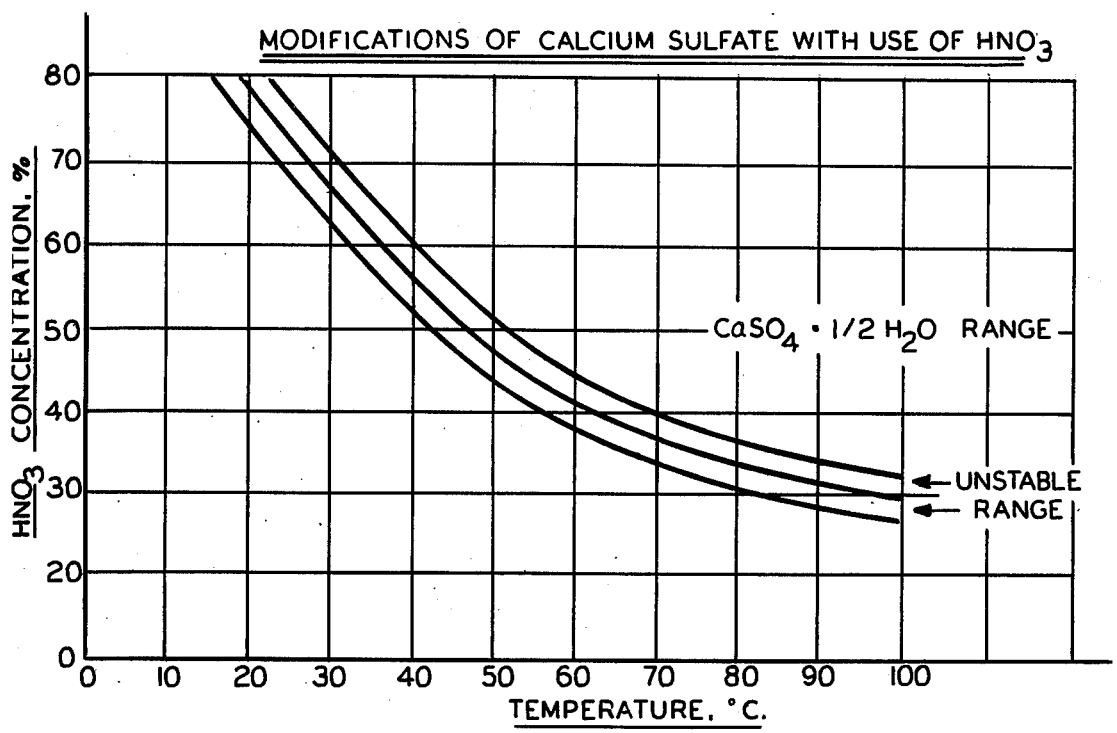
FIG. 1 is a graph plotting nitric acid concentration $c$ against minimum temperature.

The efficiency of these equations is proven by the Tables 1 and 2 in which, for given temperatures $t$ in the former and given $HNO_3$ concentrations $c$ in the latter, the corresponding concentrations or temperatures, as the case may be, are calculated by means of the above equations and then compared with the values read from FIG. 1.

TABLE 1

Calculation of the nitric acid concentrations to be used at a given reaction temperature

| Starting temp. ° C | (100/C) | $C_{calc}$ wt% $HNO_3$ | Acc. to Fig. 1 c wt-% $HNO_3$ | $(c - c_{calc})$ wt-% $HNO_3$ | $C_{pr}$ at $\Delta c = 6$ wt-% $HNO_3$ |
|---|---|---|---|---|---|
| 20 | 1.271₀ | 78.70 | 78.7 | — | 85 |
| 30 | 1.556 | 64.2 | 66.3 | 2.1 | 70 |
| 40 | 1.842 | 54.3 | 55.8 | 1.5 | 60 |
| 50 | 2.12₇ | 47.0 | 47.2 | 0.2 | 53 |
| 60 | 2.41₂ | 41.5 | 40.5 | −1.0 | 47 |
| 70 | 2.698 | 37.1 | 36.6 | −0.5 | 43 |
| 80 | 2.983 | 33.5 | 30.8 | −0.7 | 40 |
| 90 | 3.268₁ | 30.6 | 30.6 | — | 37 |
| 100 | 3.553 | 28.1 | 29.4 | 1.3 | 34 |

TABLE 2

Calculation of the reaction temperature to be maintained for a given nitric acid concentration

| Starting conc. wt-% $HNO_3$ | 100/c | $t_{calc}$ | Acc. to Fig. 1 t 20° C | $(t - t_{calc})$ 20° C | $t_{pr}$ at $\Delta t = 5°$ C 20° C |
|---|---|---|---|---|---|
| 30 | 3.333 | 92.3 | 94 | 1.7 | 97 |
| 35 | 2.857 | 75.6 | 72.9 | −2.7 | 81 |
| 40 | 2.500 | 63.1 | 60.8 | −2.3 | 68 |
| 45 | 2.222 | 53.3 | 52.9 | −0.4 | 58 |
| 50 | 2.000 | 45.6 | 46.4 | 0.8 | 51 |
| 55 | 1.818 | 38.7 | 40.8 | 2.1 | 44 |
| 60 | 1.667 | 33.9 | 35.8 | 1.9 | 39 |
| 65 | 1.538 | 29.4 | 31.2 | 1.8 | 34 |
| 70 | 1.429 | 25.5 | 26.8 | 1.3 | 31 |
| 75 | 1.333 | 22.2 | 22.9 | 0.7 | 27 |
| 80 | 1.250 | 19.3 | 19.1 | −0.2 | 24 |

The slight variation in the calculation of the nitric acid concentration and temperatures can be eliminated by appropriate safety additions. If the transformation to the semihydrate should be made to take place directly at the transformation point according to FIG. 1, then it would take longer to accomplish than in cases in which the operation is performed in the "safe region," i.e., in the range of stability of the semihydrate at a sufficient distance from the straight border lines. On the other hand, it is, of course, desirable to avoid the use of too highly concentrated nitric acid or excessively high temperatures for the transformation owing to the increased corrosion and resultant higher costs involved therein. In practice it has been found desirable to use $\Delta c$ and $\Delta t$ safety margins on the order of 5 to 6 wt-% $HNO_3$ and 5° to 6° C, respectively. The last columns of Tables 1 and 2 give examples of $HNO_3$ concentrations $C_{pr}$ and temperatures $t_{pr}$ which are to be preferred in practice.

The process of the invention is thus based on treating the impure sulfate produced in phosphoric acid manufacturing processes with nitric acid at temperatures between 22 and 100° C, using such a concentration $c$ that the nitric acid content of the entire liquid phase will range between 30 and 80 wt-% at a safe distance from the straight border lines of the stability range of the semihydrate. Thus, at a given temperature $t$, the nitric acid concentration to be selected for the process is determined by the equation $$C_{pr} = c + \Delta c \ (\text{wt-\%} \ NHO_3) \tag{4}$$

or, at a given nitric acid concentration $c$, the reaction temperature to be maintained, $t_{pr}$, is determined by the equation $$t_{pr} = t + \Delta t \ (° C), \tag{6}$$

the factors $c$ and $t$ and the constants in these equations being found on the basis of the equations 1–3, 5, 7 and 8. The safety margins $\Delta c$ and $\Delta t$ in equations 1 and 2 should amount to at least 5 to 6(wt-% $HNO_3$) or ° C, as the case may be). It is not, however, desirable to use more than 20 (wt-% or ° C) as the margin of safety, because under certain circumstances this may result in the formation of anhydride and the economic advantages of the process would be lost.

The reaction temperature necessary for a given nitric acid concentration, or the nitric acid concentration necessary for a given reaction temperature, may also be determined on the basis of a graph. It is necessary always to operate within the existence range of the semihydrate, i.e., on the basis of FIG. 2, underneath the plotted straight line. Values close to the curve or straight line, as the case may be, are to be avoided so as to achieve the quickest transformation possible. It is best first to determine the variable on the basis of the graph and then proceed on the basis of the equations 4 and 6.

The transformation is promoted by the intense stirring of the suspension. Breaking up the crystals, however, is not necessary, since the phosphate inclusions and other impurities go into solution without difficulty in the process of the invention.

The time for which the acid acts upon the sulfate precipitates depends upon the $HNO_3$ concentration, the reaction temperature, the stirring intensity, the time elapsed since the precipitation, and the nature of the impurities, which depends especially on the composition or source of the raw phosphate. In general, 1 to 6 hours will suffice, although longer detention times favor crystal growth and thus the filtrability of the precipitates. Normally, however, optimum crystal sizes have formed after only 3 to 4 hours.

The nitric acid concentration, which can be determined on the basis of the equations or diagrams or which is to be considered in determining the reaction temperature, refers to the entire liquid phase. Residual liquid adhering to the precipitates must be taken into account in determining the addition of $HNO_3$ (or in calculating the temperature) and, if necessary, the strength of the acid to be added must be increased accordingly. In case of the addition of salts with a very high content of water of crystallization, e.g., $MgSO_4 \cdot 7 H_2O$, this water content would also have to be included in determining the required strength of the acid in the entire liquid phase. After the transformation has taken place, however, the semihydrate is so stable that it can be washed with hot water without producing an immediate reconversion to dihydrate.

The calcium sulfate semihydrate obtained under the conditions of the invention has very good flexibility. It contains no untreated, i.e., water-insoluble $P_2O_5$; it can therefore be freed during filtration from all adhering impurities by a counterflow washing with water, and consequently it is very pure.

Similar results are obtained by producing the calcium sulfate semihydrate in the presence of nitric acid of suitable concentration, in statu nascendi, so to speak, in the manufacture of phosphoric acid. This eliminates the intermediate phase otherwise common in nitric acid processes, namely, the production of dihydrate. Also, the sulfuric acid commonly used in phosphoric acid processes is not required.

In this type of procedure, nitric acid simultaneously acts as a processing agent and as an agent for the attainment of pure calcium sulfate semihydrate. The sulfate ions needed for the attainment of calcium sulfate semihydrate are, in this procedure, to be in the form of soluble salts, preferably in the form of ammonium or potassium salts. In contrast to the processes mentioned above for the separation of dihydrate from phosphoric acid slurries, in this method of procedure a semihydrate is obtained in which the $P_2O_5$ contents are of the order of 0.2%, i.e., only 10 to 20% of the impurities common in the other processes.

The semihydrate or dihydrate produced in phosphoric acid production processes by the procedure of the prior art cannot be used for building purposes without special refining processes on account of the high concentration of impurities. In most cases it must be discarded as waste or storage dumping areas must be prepared for it. In contrast, the filtered and washed semihydrate yielded by the process of the invention can be made directly into building board. While the types of gypsum produced in the prior-art phosphoric acid manufacturing processes have to be purified, dried and transformed by the re-addition of water to castable products by expensive and usually difficult procedures by which, under certain circumstances, environmentally harmful substances such as dust and hydrogen fluoride are emitted, these procedures are superfluous in the process of the invention, since virtually no worthless wastes are produced and, at no additional cost, a valuable product is obtained for the preparation of building boards or for plasters for other purposes.

In the following Examples, all parts and percentages are by weight unless noted otherwise.

EXAMPLE 1a

Conventinal Treatment

Phosphoric acid gypsum with a content (referred to dry substance) of

| $P_2O_5$ | total | 2.06% |
|---|---|---|
| $P_2O_5$ | water soluble | 0.94% | is stirred for 3 hours at 50° C with 2 parts water, then filtered and the filter cake is washed with water. The washed gypsum had the following impurities:

| $P_2O_5$ | total | 1.26% |
|---|---|---|
| $P_2O_5$ | water soluble | 0.14% |

EXAMPLE 1b

Refining Process with Nitric Acid of Excessively Low Concentration or Excessively Low Temperature The untreated phosphoric acid gypsum used in 1a above is stirred for 3 hours at 50° C with 2 parts of 40% nitric acid, and then filtered and the filter cake is washed. The washed gypsum had the following impurities:

| $P_2O_5$ | total | 0.96% |
|---|---|---|
| $P_2O_5$ | water soluble | 0.08% |

EXAMPLE 1c

Refining Process of the Invention

The gypsum used in 1a is stirred for 3 hours at 50° C with 2 parts of 65% $HNO_3$. The semihydrate that forms is removed by filtration and the filter cake is washed with water. The washed gypsum had the following impurities:

| $P_2O_5$ | total | 0.09% |
|---|---|---|
| $P_2O_5$ | water soluble | 0.08% |

1c (invention) is patently less impure than 1a and 1b. The calcium sulfate semihydrate produced in 1c is then stirred without the addition of any more water and is cast to form a board which soon hardens.

EXAMPLE 2

Refining Process of the Invention

Gypsum is separated by centrifugation from a normal phosphoric acid slurry (dihydrate gypsum suspended in phosphoric acid), dissolved in 2 parts of 65% nitric acid, and treated for 3 hours at 65° C. Here, too, a transformation to the semihydrate takes place. Whereas the unwashed gypsum had a $P_2O_2$ content of 13.6% before the addition of the nitric acid, the washed semihydrate contains the following impurities:

| $P_2O_5$ | total | 0.23% |
|---|---|---|
| $P_2O_5$ | water soluble | 0.10% |

EXAMPLE 3a

Calcium Sulfate Dihydrate Precipitation with Ammonium Sulfate ($HNO_3$ Concentration and Reaction Temperature in the Dihydrate Range)

In a continuous process 10 kg of raw phosphate rock are treated per hour with 36 kg of 50% $HNO_3$ which has been diluted to 35% acid with the wash water from the gypsum washing, and gypsum is precipitated by the simultaneous addition of 13 kg of ammonium sulfate. After a detention time of 5 hours at a temperature of 65° C, the crystals consisting of $CaSO_4 \times 2\, H_2O$ are removed by filtration and washed. The filter cake contains the following impurities:

| $P_2O_5$ | total | 1.32% | = 8.5% loss of input $P_2O_5$ |
|---|---|---|---|
| $P_2O_5$ | water soluble | 0.58% | |
| $NH_3$—N | | 0.32% | |
| $NO_3$—N | | 0.57% | |
| $H_2O$ | | 45 % | |

EXAMPLE 3b

Calcium Sulfate Semihydrate Precipitation with Ammonium Sulfate (the Process of the Invention)

In a continuous process, 10 kg per hour of raw phosphate is treated with 13 kg of ammonium sulfate and 25 kg of 70% $HNO_3$ diluted to approximately 50% $HNO_3$ with wash water from the gypsum washing, and stirred for 5 hours at 65° C, whereupon crystals of $CaSO_4 \times \frac{1}{2}\, H_2O$ are formed, which are removed by filtration and washed. The filter cake consists of $CaSO_4 \times \frac{1}{2}\, H_2O$ containing the following impurities:

| $P_2O_5$ | total | 0.21% | = 1% loss of input $P_2O_5$ |
|---|---|---|---|
| $P_2O_5$ | water soluble | 0.11% | |
| $NH_3$—N | | 0.11% | |
| $NO_3$—N | | 0.06% | |
| $H_2O$ | | 33 % | |

The $CaSO_4 \times \frac{1}{2}\, H_2O$ is stirred to a fluid state and cast by means of a mold into boards which harden after a short time.

Comparison of 3a and 3b shows that the semihydrate produced by the method of the invention (3b) contains much less impurities than the $CaSO_4 \times 2\, H_2O$ produced in Experiment 3a.

EXAMPLE 4

Calcium sulfate Semihydrate Precipitation with Potassium Sulfate

In a continuous process, 10 kg per hour of raw phosphate is treated with 45 kg of 40% $HNO_3$ with the simultaneous addition of 18 kg potassium sulfate at a temperature of 80° C. After a detention time of 3 hours the crystals consisting of $CaSO_4 \times \frac{1}{2}\, H_2O$ are removed by filtration. The filter cake, after washing with hot water, contains the following impurities:

| $P_2O_5$ | total | 0.30% |
|---|---|---|
| $P_2O_5$ | water soluble | 0.10% |
| $NO_3$—N | | 0.10% |
| $K_2O$ | | 0.20% |
| $H_2O$ | | 35 % |

Compare these results with the results of Example 3a.

What is claimed is:

1. A process for the preparation of refined synthetic calcium sulfate semihydrate from impure phosphate containing wet gypsum which consists essentially of:
   A. Dispersing said impure wet phosphate containing gypsum in a liquid phase containing nitric acid and stirring the resultant dispersion while maintaining the same at a temperature of 22°–100° C. while employing nitric acid in a concentration between 30 and 80 weight percent $HNO_3$;
   B. One of said reaction conditions of temperature or nitric acid concentration being fixed in said ranges, the other being selected within the stability range of calcium sulfate semihydrate which is determined by the area located below the straight line defined by the equation:

$$100/c = 0.02853\, t + 0.7004$$

wherein $c$ is the concentration of nitric acid in weight percent and $t$ is the temperature in ° C, and bounded by the axis of the abscissa $100/c$ in a $(t/100/c)$ diagram with integration between the $100/c$ values corresponding to said concentrations $(100/30 = 3.33$ and $100/80 = 1.25)$ and excluding the range of values for $t < 22°$ and for $t < 100°$ C;
   C. If carrying out the process at a fixed temperature, adjusting the nitric acid concentration $C_{pr}$ for the purification and recrystallization liquid according to the equations:

$$100/c = 0.02853\, t + 0.7004$$

$$C_{pr} = c + \Delta c \text{ weight percent } HNO_3,$$

and $$5 \leq \Delta c < 20 \text{ weight percent } HNO_3;$$

D. If starting from a liquid in which the nitric acid concentration C is fixed, adjusting the temperature of the acidulation mixture to a temperature $t_{pr}$ according to the equations:

$$t = 35.05\, \frac{100}{c} - 24.55° \text{ C} \qquad \text{(Equation A)}$$

$$t_{pr} = t + \Delta t° \text{ C} \qquad \text{(Eq. B)}$$

and
   $$5 \leq \Delta t < 20° \text{ C}$$

thereby dissolving most of the phosphate impurities in said impure gypsum;
   E. Recrystallizing the gypsum as calcium sulfate semihydrate, separating the recrystallized product from the liquid phase, and washing the recrystallized separated product in counter-flow with water and recovering calcium sulfate semihydrate.

2. A process according to claim 1 wherein the washed semihydrate is cast while moist without drying the same into gypsum board.

3. A process according to claim 1 wherein the phosphate containing wet gypsum is the result of contacting phosphate rock with sulfuric acid or a mixture of sulfuric acid with phosphoric or nitric acid, the amount of sulfate ions in the liquid phase being in excess of the calcium ions and sufficient to precipitate calcium sulfate from the acid solution.

4. A process according to claim 1 wherein the digestion step of step A is performed upon a precipitate obtained from acidulation of phosphate rock with acid having an amount of sulfate ions insufficient to precipitate calcium sulfate which phosphate rock has been treated with sufficient ammonium sulfate or potassium sulfate to effect precipitation of calcium sulfate.

5. A process according to claim 1 wherein the digestion step A is performed upon a precipitate obtained from acidulation of phosphate rock with nitric acid, which decomposition mixture has been treated with sufficient ammonium sulfate or potassium sulfate to effect precipitation of calcium sulfate, stirring the resultant reaction mixture without filtration at a temperature corresponding to the equations A and B, thereby dissolving most of the phosphate impurities and recrystallizing the precipitate into calcium sulfate semihydrate, separating the calcium sulfate semihydrate and washing the same with water.

* * * * *

UNITED STATES PATENT AND TRADEMARK OFFICE
CERTIFICATE OF CORRECTION

PATENT NO. : 4,113,835
DATED : September 12, 1978
INVENTOR(S) : Hans-Friedrich Kurandt et al It is certified that error appears in the above-identified patent and that said Letters Patent are hereby corrected as shown below:

Column 1, line 31, "cystals" should read -- crystals --.

Column 5, line 15, "flexibility" should read -- filtrability --.

Column 5, line 65, "Conventinal" should read -- Conventional --.

Column 8, line 30, "acic" should read -- acid --.

Signed and Sealed this

Twenty-eighth Day of November 1978

[SEAL]

Attest:

RUTH C. MASON
Attesting Officer

DONALD W. BANNER
Commissioner of Patents and Trademarks